United States Patent Office 3,505,586
Patented Apr. 7, 1970

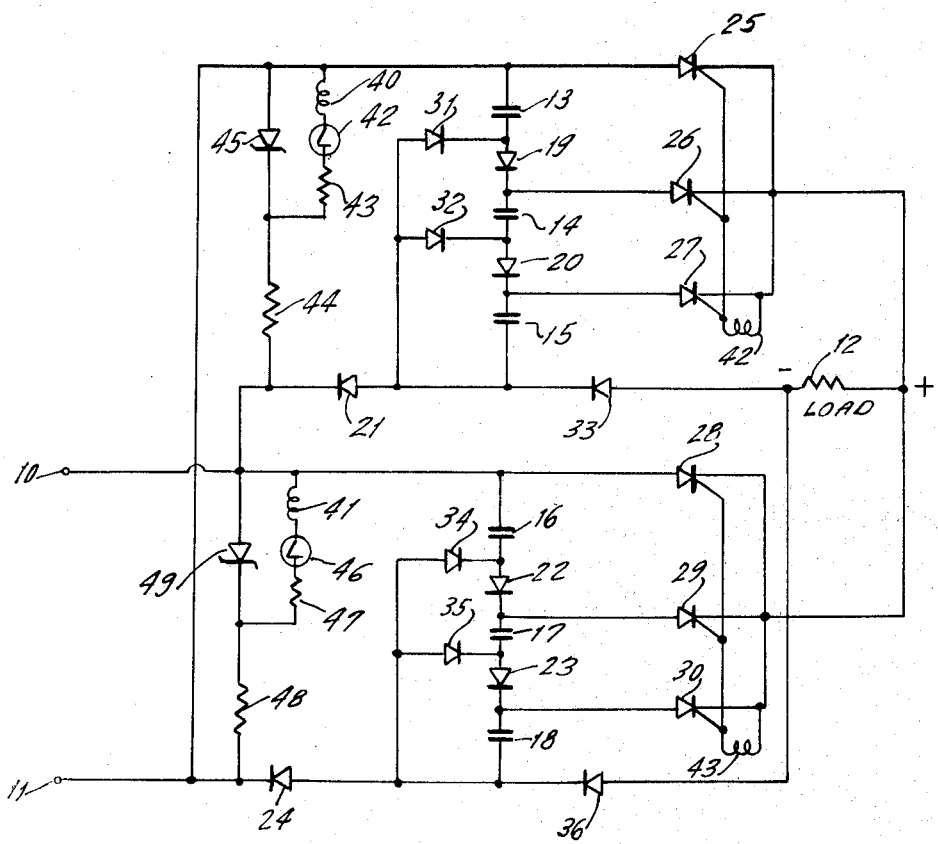

3,505,586
TRANSFORMERLESS HIGH-CURRENT POWER SUPPLY
Gerald F. Dulin, Torrance, Calif., assignor to International Rectifier Corporation, El Segundo, Calif., a corporation of California
Filed Feb. 27, 1968, Ser. No. 708,670
Int. Cl. H02m 7/22
U.S. Cl. 321—15
3 Claims

ABSTRACT OF THE DISCLOSURE

A high-current supply contains a plurality of capacitors which are charged in series from an A-C source, and are discharged in parallel through respective controlled rectifiers and through a D-C load.

---

This invention relates to rectifier power supplies, and more particularly relates to a low-voltage high-current power supply driven from a relatively high-voltage A-C source.

Low-voltage power supplies commonly require a heavy and bulky transformer to adjust the input voltage to a rectifier system to the output requirements of the invention. In accordance with the invention, the need for the transformer is eliminated by a novel circuit in which a plurality of capacitors are charged from the A-C line in series with one another, and are discharged in parallel with one another through a common load and through respective controlled rectifiers.

Accordingly, a primary object of this invention is to provide a compact, light-weight power supply.

A further object of this invention is to eliminate the step-down rectifier transformer normally required in a high-current, low-voltage power supply.

These and other objects of this invention will become apparent from the following description of the drawing which shows a circuit embodying the invention:

Referring now to the drawing, there is shown a circuit for single-phase operation in which an A-C source (not shown) is connected directly to A-C terminals 10 and 11, with the circuit applying a D-C output across a D-C load 12, which is a low-voltage, high-current load whereas the A-C source is a relatively high-voltage, and relatively low-current source.

In particular, the A-C source may supply 120 volts RMS and 5 amperes RMS, with the load 12 carrying 50 volts D-C and 13.5 amperes D-C. Normally, this would require a standard step-down transformer having a secondary voltage of 56 volts, with the present invention eliminating the transformer. Obviously, different current-voltage relations could be obtained within the invention by the number of elements used in the circuit to be described.

In accordance with the invention, and for the embodiment thereof shown in the drawing, two sets of three series-connected identical capacitors 13, 14, 15 and 16, 17, 18 are each connected across A-C terminals 10 and 11 in series with interposed diodes 19, 20, 21 and 22, 23, 24, respectively. Capacitors 13 to 18 are connected in closed series relation with the controlled rectifiers 25 to 30, respectively, the D-C load 12, and the discharge diodes 31 to 36, respectively.

Thus, when terminal 11 becomes positive, capacitors 13 to 15 are charged in series through diodes 19 to 21, respectively, and are discharged in parallel through their respective controlled rectifiers 25 to 27 through diodes 31 to 33, respectively. Similarly, capacitors 16 to 18 are charged in series when terminal 10 becomes positive, and are discharged in parallel when their respective controlled rectifiers 28 to 30 are fired. It is this novel arrangement which permits the conversion of low A-C current-high A-C voltage to high D-C current-low D-C voltage without the use of the standard rectifier transformer.

In order to fire controlled rectifiers 25 to 30, two pulse transformers are provided having primary windings 40 and 41, respectively, and secondary windings 42 and 43, respectively, which are connected in the gate circuits of controlled rectifier groups 25, 26, 27 and 28, 29, 30, respectively. Winding 40 is connected in series with terminal 10, breakover device 42 and current limiting resistors 43 and 44 and in parallel with Zener diode 45 which limits the maximum voltage across devices 40 and 42. In a similar manner, winding 41 is associated with breakdown device 46, resistors 47 and 48 and Zener diode 49.

In operation, and assuming terminal 11 becomes positive, a charging current flows through capacitors 13, 14 and 15 charging each to one-third the crest value of the supply voltage. On the succeeding half cycle when terminal 10 becomes positive, the voltage increases across break-over diode 42 with forward bias direction. When the voltage across diode 42 is sufficiently high to cause breakdown thereof so that a high current pulse flows through winding 40, this induces a firing pulse in the secondary winding 42 to fire control rectifiers 25, 26 and 27. Capacitors 13 to 15 then discharge in parallel through the load.

The operation of the circuit, including capacitors 16 to 18 is identical to the above for half cycles of opposite polarity.

The operation of the circuit including capacitors 16 to 18 is identical to the above for the next half wave when terminal 10 becomes positive.

It will be apparent that any desired transformation ratio can be obtained by using the appropriate number of capacitors and related controlled rectifiers, charging diodes and discharge diodes. Moreover, other circuit configurations could be used, as will be apparent to those skilled in the art such as single phase half wave circuits; three phase half wave and full wave circuits and the like.

Although this invention has been described with respect to its preferred embodiments, it should be understood that many variations and modifications will now be obvious to those skilled in the art, and it is preferred, therefore, that the scope of the invention be limited not by the specific disclosure herein.

The embodiments of the invention in which an exclusive privilege or property is claimed are defined as follows:

1. A power supply comprising first and second A-C terminals; first and second D-C terminals; a plurality of series-connected capacitors connected in series with said first and second A-C terminals; a plurality of controlled rectifiers; each of said plurality of controlled rectifiers connected in a closed series-connected circuit including a respective capacitor of said series-connected capacitors and said first and second D-C terminals; a common firing circuit means connected to each of said controlled rectifiers for firing said plurality of controlled rectifiers; means connecting said common firing circuit means to said A-C terminals for simultaneously firing said controlled rectifiers when said plurality of capacitors are charged to a given level; said common firing circuit means for each of said controlled rectifiers including a pulse transformer; said pulse transformer having at least one winding; said means connecting said firing circuit means to said A-C terminals including a voltage responsive switch means which conducts current when the voltage across said voltage responsive switch means reaches a particular value; said at least one winding and said voltage responsive switch means connected in series with said A-C terminals whereby said controlled rectifiers conduct when the voltage of siad A-C terminals reaches a predetermined value.

2. The device of claim 1 which includes a plurality of charging diodes; each of said charging diodes connected in series with a respective capacitor of said plurality of capacitors and permitting the flow of charging current to their said respective capacitors only when the polarity of said first A-C terminal becomes positive.

3. The device of claim 2 which includes a plurality of discharge diodes; each of said discharge diodes connected in a respective closed series-circuit of said closed series-circuits including said plurality of controlled rectifiers, said respective capacitors, and said first and second D-C terminals.

References Cited

UNITED STATES PATENTS 3,371,232   2/1968   Hannan et al. _____ 321—15 X
3,432,738   3/1969   Jensen _____ 321—15

OTHER REFERENCES

Scientific & Technical Aerospace Reports: "Capacitive Doubler," and "Capacitive Divider," issue No. 9, May 8, 1965, p. 1430. Copy in class 321–2.

Electronic: "D-C Converter Circuit Uses Capacitors," Mar. 21, 1966, pp. 97–98. Copy in class 321–15.

LEE T. HIX, Primary Examiner

W. H. BEHA, JR., Assistant Examiner

U.S. Cl. X.R.

307—110